United States Patent
Kim et al.

(10) Patent No.: US 8,506,106 B2
(45) Date of Patent: Aug. 13, 2013

(54) BACKLIGHT UNIT AND DISPLAY APPARATUS INCLUDING THE SAME

(75) Inventors: Yong Suk Kim, Pyeongtaek-Si (KR);
Won Do Kee, Pyeongtaek-Si (KR);
Chan Sung Jeong, Pyeongtaek-Si (KR);
Seung Se Kim, Pyeongtaek-Si (KR)

(73) Assignee: LG Electronics Inc., Seoul (KR)

(*) Notice: Subject to any disclaimer, the term of this patent is extended or adjusted under 35 U.S.C. 154(b) by 695 days.

(21) Appl. No.: 12/706,661

(22) Filed: Feb. 16, 2010

(65) Prior Publication Data

US 2011/0026239 A1 Feb. 3, 2011

(51) Int. Cl.
*G02F 1/13357* (2006.01)

(52) U.S. Cl.
USPC ......... 362/97.1; 362/97.2; 362/613; 362/615; 362/610

(58) Field of Classification Search
USPC ............... 362/600, 97.1, 610, 615, 616, 97.2, 362/613
See application file for complete search history.

(56) References Cited

U.S. PATENT DOCUMENTS

| | | | | |
|---|---|---|---|---|
| 7,458,709 B2* | 12/2008 | Lang et al. | ...................... | 362/612 |
| 7,611,262 B2* | 11/2009 | Chang | ........................... | 362/246 |
| 7,728,923 B2* | 6/2010 | Kim et al. | ........................ | 349/65 |
| 8,033,676 B2* | 10/2011 | Lee et al. | ...................... | 362/97.1 |
| 8,092,064 B2* | 1/2012 | Erchak et al. | ................. | 362/613 |
| 8,251,562 B2* | 8/2012 | Kuramitsu et al. | ............ | 362/616 |
| 8,322,904 B2* | 12/2012 | Lee et al. | ...................... | 362/613 |
| 2007/0058393 A1* | 3/2007 | Kim et al. | ...................... | 362/613 |
| 2011/0026243 A1* | 2/2011 | Lee et al. | ...................... | 362/97.2 |
| 2011/0141396 A1* | 6/2011 | Nakamura et al. | ............... | 349/62 |

FOREIGN PATENT DOCUMENTS

| KR | 10-2001-0085460 A | 9/2001 |
|---|---|---|
| KR | 10-2005-0035908 A | 4/2005 |
| KR | 10-2006-0106774 A | 10/2006 |
| KR | 10-2007-0029365 A | 3/2007 |
| KR | 10-2007-0104149 A | 10/2007 |

* cited by examiner

*Primary Examiner* — Anabel Ton
(74) *Attorney, Agent, or Firm* — Birch, Stewart, Kolasch & Birch, LLP

(57) ABSTRACT

A back-light unit including a plurality of substrates, a plurality of light sources respectively disposed on the plurality of substrates and configured to emit light, and N (N≧2) light guide panels respectively disposed adjacent to the plurality of light sources, a corresponding light guide panel including a light incidence part having a light incidence surface for receiving light emitted from a corresponding light source, and a light emission part for emitting the received incident light. Further, the corresponding light guide panel includes protruding surface patterns protruding from an upper surface the light emission part.

22 Claims, 10 Drawing Sheets

BACKLIGHT UNIT AND DISPLAY APPARATUS INCLUDING THE SAME

CROSS-REFERENCE TO RELATED APPLICATIONS

The present application claims priority under 35 U.S.C. 119 and 35 U.S.C. 365 to Korean Patent Application No. 10-2009-0070463 (filed on Jul. 31, 2009), which is hereby incorporated by reference in its entirety. This application is also related to application Ser. No. 61/231,475, which is also incorporated by reference in its entirety.

BACKGROUND OF THE INVENTION

1. Field of the Invention

The present disclosure relates to a backlight unit and a display apparatus including the backlight unit.

2. Discussion of the Related Art

Commercial display apparatuses include liquid crystal display devices (LCDs), plasma display panels (PDPs), electro luminescent displays (ELDs), and vacuum fluorescent displays (VFDs). Further, the LCD has a liquid crystal panel that includes a liquid crystal layer, a thin film transistor (TFT) substrate, and a color filter substrate facing the TFT substrate with the liquid crystal layer therebetween. Such a liquid crystal panel does not have a light source, and instead uses light provided by a backlight unit to display an image. However, the displayed image is not always clear, and the backlight unit generates excessive heat.

SUMMARY OF THE INVENTION

Accordingly, one object of the present invention is to address the above-noted and other problems.

Another object of the present invention is to improve the quality of a displayed image.

To achieve these and other advantages and in accordance with the purpose of the present invention, as embodied and broadly described herein, the present invention provides in one aspect A back-light unit including a plurality of substrates, a plurality of light sources respectively disposed on the plurality of substrates and configured to emit light, and N (N≧2) light guide panels respectively disposed adjacent to the plurality of light sources, a corresponding light guide panel including a light incidence part having a light incidence surface for receiving light emitted from a corresponding light source, and a light emission part for emitting the received incident light. Further, the corresponding light guide panel includes protruding surface patterns protruding from an upper surface the light emission part.

In another aspect, the present invention provides a display apparatus including a display panel, and a backlight unit at a rear surface of the display panel. The backlight unit includes a plurality of substrates, a plurality of light sources respectively disposed on the plurality of substrates and configured to emit light, and N (N≧2) light guide panels respectively disposed adjacent to the plurality of light sources, a corresponding light guide panel including a light incidence part having a light incidence surface for receiving light emitted from a corresponding light source, and a light emission part for emitting the received incident light. Further, the light guide panel includes protruding surface patterns protruding from an upper surface the light emission part.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE EMBODIMENTS

Figure 1:
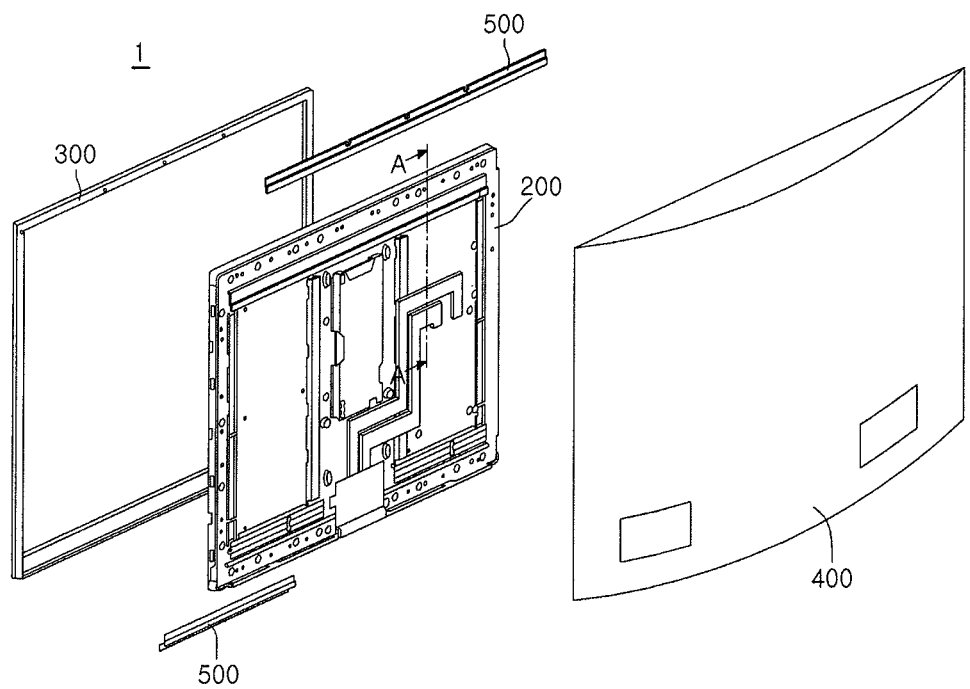
FIG. 1 is an exploded perspective view illustrating a display apparatus according to an embodiment of the present invention.

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the disclosure to those skilled in the art. In the drawings, the shapes and sizes of elements may be exaggerated for clarity.

FIG. 1 is an exploded perspective view illustrating a display apparatus 1 according to an embodiment. Referring to FIG. 1, the display apparatus 1 includes a display module 200, a front cover 300 and a back cover 400 that surrounds the display module 200, and a fixing member 500 for fixing the display module 200 to at least one of the front cover 300 and the back cover 400.

Further, a portion of the fixing member 500 is fixed to the front cover 300 through a coupling member such as a screw, and then another portion of the fixing member 500 supports the display module 200 with respect to the front cover 300 so that the display module 200 can be fixed with respect to the front cover 300. Although the fixing member 500 has an elongated plate shape in the current embodiment, the display module 200 may be fixed to the front cover 300 or the back cover 400 through a coupling member without the fixing member 500.

Figure 2:
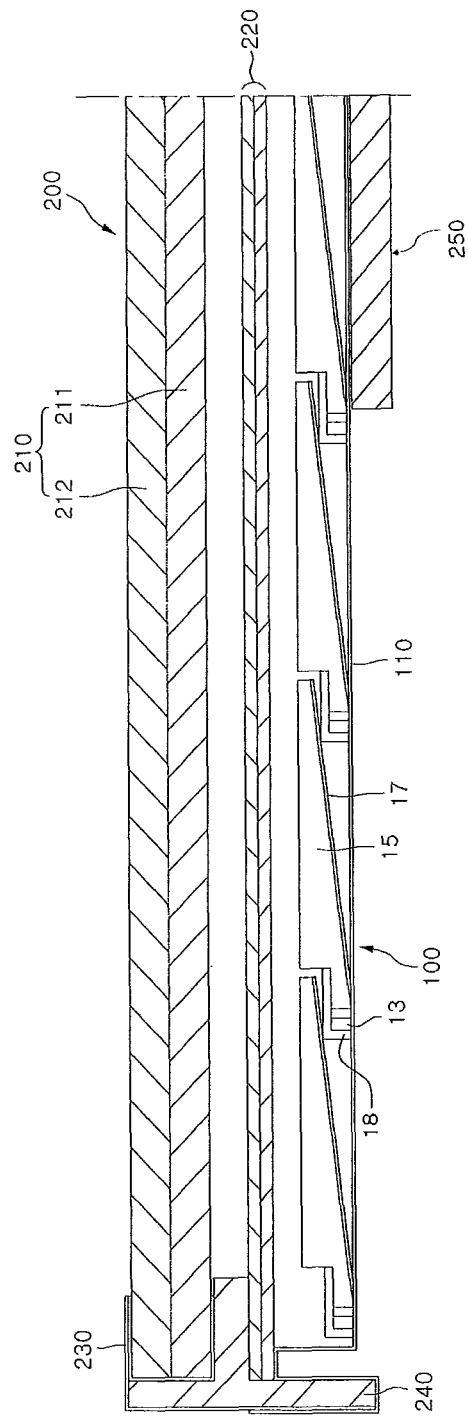
FIG. 2 is a cross-sectional view taken along line A-A of FIG. 1.

Next, FIG. 2 is a cross-sectional view taken along line A-A of FIG. 1. Referring to FIG. 2, the display module 200 includes a display panel 210 for displaying an image, a backlight unit 100 emitting light to the display panel 210, a bottom cover 110 providing the lower appearance of the display module 200, a panel supporter 240 supporting the display panel 210 from the lower side, and a top cover 230 supporting the display panel 210 from the upper side and constituting a border of the display module 200.

In addition, the bottom cover 110 may have a box shape with an open upper surface to receive the backlight unit 100. A side of the bottom cover 110 may also be fixed to a side of the top cover 230. For example, a coupling member such as a screw may pass through a side surface of the display module 200, that is, through a side where the bottom cover 110 overlaps the top cover 230 to fix the bottom cover 110 and the top cover 230.

Further, a rear surface of the bottom cover 110 includes at least one substrate 250 for driving the display module 200 with a signal transmitted from the outside, e.g. an image signal. The substrate 250 may be, e.g., a driving part of an image display and/or a backlight unit such as a timing controller, a T-con board, or a main printed circuit board (PCB), and is fixed to the rear surface of the bottom cover 110 through an adhesive member or a coupling member such as a screw.

Also, as shown in the embodiment in FIG. 2, the display panel 210 includes a lower substrate 211 and an upper substrate 212 attached to each other with a constant cell gap, and a liquid crystal layer interposed between the lower substrate 211 and the upper substrate 212. The lower substrate 211 includes a plurality of gate lines and a plurality of data lines crossing the gate lines. Thin film transistors (TFTs) are also disposed in crossing areas of the gate and data lines.

In addition, the upper substrate 212 may be provided with color filters, but the structure of the display panel 210 is not limited thereto. For example, the lower substrate 211 may include color filters as well as TFTs. In addition, the structure of the display panel 210 may be varied according to a method of driving the liquid crystal layer.

In addition, an edge of the display panel 210 may include a gate driving printed circuit board (PCB) supplying scan signals to the gate lines, and a data driving PCB supplying data signals to the data lines. One of the upper and lower sides of the display panel 210 may also include a polarized light filter.

Also includes is an optical sheet 220 disposed between the display panel 210 and the backlight unit 100. However, the optical sheet 220 may not be included, and thus the present disclosure is not limited thereto. The optical sheet 220 may also include at least one of a spread sheet and a prism sheet. In more detail, the spread sheet uniformly spreads light emitted from a light guide panel, and the prism sheet focuses the spread light to the display panel 210. The prism sheet including one or more illumination enhancement films and at least one of a horizontal prism sheet and a vertical prism sheet may also be selectively provided. Further, the types and number of optical sheets may be varied within the scope of the present disclosure.

In addition, the backlight unit 100 includes a plurality of optical assemblies 10 (see FIG. 3), each of which includes a light source 13, a light guide panel 15, a reflecting member 17 and a fixing bracket 18. The light source 13 is disposed on a side of the light guide panel 15 to emit light to the side of the light guide panel 15. Further, the light source 13 may include one or more light emitting diodes (LEDs).

Also, the LED may be a side illumination-type LED, and be a color LED emitting at least one of red, blue, and green light, or a white LED emitting white light. The color LED may also include at least one of a red LED, a blue LED, and a green LED, and the arrangement and light type of the LEDs may be varied within the scope of the present disclosure. The LED may also be disposed on the upper surface of a substrate, and emit light having a wavelength ranging from about 430 to 480 nm. A fluorescent material may also be applied on a light emitting surface of the LED to transmit light emitted from the LED.

Further, in one embodiment, the light source 13 emits light to the light guide panel 15 at a constant angle, e.g., at an angle of about 120°. The light guide panel 15 then refracts and diffuses light laterally emitted from the light source 13 in the upper direction, that is, to the display panel 210. The light guide panel 15 may also be transparent. For example, the light guide panel 15 may be formed of one of acryl-based resin such as polymethyl metaacrylate (PMMA), polyethylene terephthlate (PET), poly carbonate (PC), and polyethylene naphthalate (PEN). The light guide panel 15 may also be formed using an extrusion molding method.

In addition, light incident in the lateral direction from the light source 13 is refracted and diffused upward by the light guide panel 15. In more detail, the lower surface of the light guide panel 15 includes the reflecting member 17 for reflecting light upward. At least one of the light guide panels 15 also overlaps at least one portion of the adjacent light guide panel 15. Further, the lower surface of the light guide panel 15 is inclined upward from a first side to a second side.

As shown in FIG. 2, the first side of the light guide panel 15 includes the fixing bracket 18 for fixing the light guide panel 15 to the bottom cover 110. The fixing bracket 18 presses at least one of the light guide panel 15 to the bottom cover 110, and is fixed. Also, the light source 13 is disposed in the fixing bracket 18 to prevent light from being emitted from the light source 13 to the outside without passing through the light guide panel 15.

Further, as shown in FIG. 2, the light guide panel 15 of one of the adjacent optical assemblies 10 overlaps the upper side the fixing bracket 18 of another of the adjacent optical assemblies in at least one portion of the light guide panel 15. In addition, the light source 13 and the light guide panel 15 are illustrated in FIG. 2 on the basis of their functions, but the shape, coupling structure and relative position of the light source 13 and the light guide panel 15 may be varied within the scope of the present disclosure.

The display panel 210 can also have a plurality of division areas corresponding to the light guide panels 15. In this instance, the intensity of light emitted from the light guide panel 15 of the optical assembly 10 (see FIG. 3), that is, the brightness of light emitted from the light guide panel 15 is adjusted according to a gray peak value or a color coordinate signal of the corresponding division area so as to adjust the brightness of the display panel 210.

Figure 3:
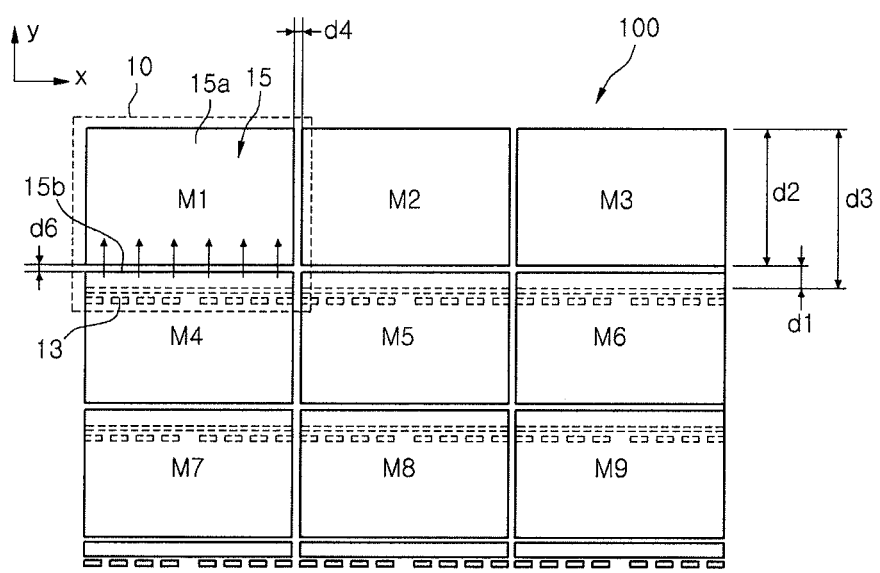
FIG. 3 is a plan view illustrating a backlight unit according to an embodiment of the present invention.
Figure 4:
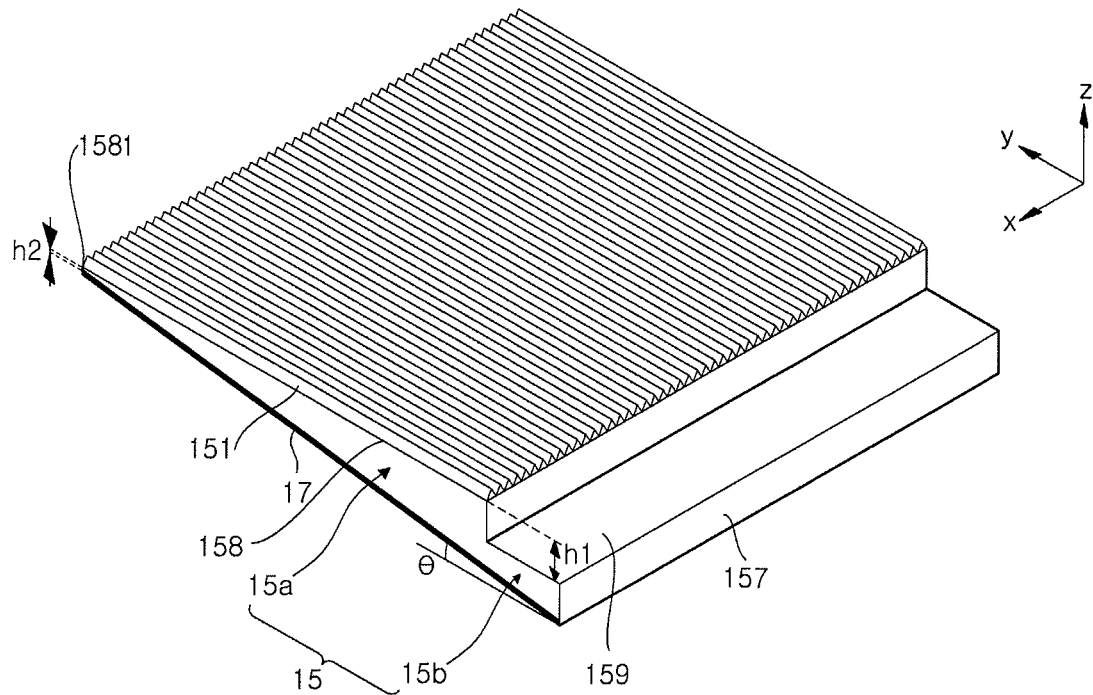
FIG. 4 is a perspective view illustrating a light guide panel according to an embodiment of the present invention.

Next, referring to FIGS. 3 and 4, the optical assemblies 10 of the backlight unit 100 are arrayed in an N×M matrix (N is the number of rows arrayed along a y-axis direction, M is the number of columns arrayed along an x-axis direction, and M and N are natural numbers equal to 2 or greater). Each of the optical assemblies 10 also includes the light source 13 and the light guide panel 15.

Further, in the embodiment in FIG. 3, each optical assembly 10 is driven in an edge-type backlight manner where the light source 13 emits light in a first direction (y-axis direction) from one side of the light guide panel 15, and operates as a single light source. In this state, the optical assemblies 10 are arrayed in a direct-type backlight manner to constitute the backlight unit 100.

Thus, the LEDs producing a hot spot on a screen can be prevented, and the thickness of the light guide panel 15 and the number of optical films can be reduced to achieve the slimness of the backlight unit 100. For example, in the embodiment of FIG. 3, the backlight unit 100 includes nine optical assemblies 10 (M1 to M9) in a 3×3 matrix. However, the present disclosure is not limited to this embodiment. For example, the matrix of the optical assemblies 10 can be varied according to a screen size of a display apparatus.

In addition, each optical assembly 10 can be manufactured as a discrete assembly, and the optical assemblies 10 are placed adjacent to each other to constitute a module-type backlight unit that is a backlight member configured to provide light to the display panel 210. Further, the backlight unit 100 may be driven using an entire driving method or a local driving method such as a local dimming method and an impulsive method. The method of driving the LEDs can also be varied according to a circuit design, and thus is not limited. According to one embodiment, a color contrast ratio is also increased, and a bright region and a dark region can be sharply expressed on a screen, thereby improving the image quality.

That is, the backlight unit 100 is operated by a plurality of division driving areas corresponding to the light guide panels 15, and the brightness of the division driving area is linked with the brightness corresponding to an image signal. Thus, the brightness in a dark portion of an image is decreased, and the brightness in a bright portion of the image is increased so as to improve a contrast ratio and sharpness of the image. That is, the backlight unit 100 is divided into a plurality of division driving areas, i.e., into a plurality of blocks that are independently driven.

For example, a portion of the optical assemblies 10 (M1 to M9) is independently driven to emit light. In more detail, the light sources 13 of the optical assemblies 10 (M1 to M9) may be independently controlled. Further, an area of the display panel 210 corresponding to one of the optical assemblies 10 or one of the light guide panels 15 may be divided into two or more blocks, and the display panel 210 and the backlight unit 100 may be dividedly driven in a block unit.

In addition, as shown in FIG. 4, the light guide panel 15 includes a light incident part 15b and a light emitting part 15a that decreases in thickness from a first side adjacent to the light incident part 15b to a second side. Light is also incident to a first side of the light incident part 15b in the first direction (along the y-axis) as the lateral direction. Further, the light sources 13 are arrayed along a light incident surface 157 disposed on the first side of the light incident part 15b.

Also, in one embodiment, the light sources 13 are also spaced at a substantially constant distance from each other, and rays of light from the light sources 13 to the light incident surface 157 are mixed into a uniform single ray or streak of light through the light incident part 15b. In addition, the first side of the light emitting part 15a is connected to a second side of the light incident part 15b. Light mixed in the light incident part 15b is also emitted upward, that is, through an upper surface 158 of the light emitting part 15a. Further, a plurality of optical patterns 151 are disposed on the upper surface 158 of the light emitting part 15a to efficiently emit light upward. The optical patterns 151 will be described in more detail later.

Further, as shown in FIG. 4, the upper surface 158 of the light emitting part 15a is different in height from an upper surface 159 of the light incident part 15b, which forms a stair part having a predetermined height h1. As described above, for example, the number of rows of the light guide panels 15 arrayed along the y-axis direction is N (N is 2 or greater). Further, a second end 1581 of the light emitting part 15a of the light guide panel 15 in a $K^{th}$ row (K is one of 1 to N−1) of the N rows is disposed above the light incident part 15b of the light guide panel 15 in a $K+1^{th}$ row, so that the two adjacent light guide panels 15 overlap each other in at least one portion.

In addition, the light sources 13 disposed on a module substrate may be a plurality of light emitting diodes that emit light having a wavelength ranging from about 430 to 480 nm. A fluorescent material may also be applied on light emitting surfaces of the light sources 13 to transmit light emitted from the light emitting diodes.

Further, the heights of the light sources 13 are equal to or less than the vertical height of the light incident surface 157. That is, when the heights of the light sources 13 are greater than the vertical height of the light incident surface 157, a portion of light emitted from the light emitting surfaces of the light sources 13 is not incident to the light incident surface 157, and may leak out. Because the light sources 13 emit light, e.g., with an orientation angle of about 90° or greater with respect to the first direction, the height of the light incident surface 157 is greater than those of the light sources 13.

However, when the height of the light incident surface 157 is greater than two times the heights of the light sources 13, light leak prevention and light efficiency increase are not achieved. Rather, excessive light diffusion decreases light efficiency. Thus, according to the current embodiment, the height of the light incident surface 157 is equal to the heights of the light sources 13, or less than two times the heights of the light sources 13.

In addition, the heights of the light sources 13 are defined by the distances from the upper surface of the module substrate including the light sources 13 to the tops of the light sources 13. Further, as shown in FIG. 4, the lower surface of the light guide panel 15 is inclined upward from the first side of the light incident part 15b to the second end 1581 of the light emitting part 15a.

Thus, the entire vertical thickness of the light guide panel 15 is decreased from the first side of the light incident part 15b to the second end 1581 of the light emitting part 15a. In this instance, the second end 1581 of the light emitting part 15a has a predetermined height h2, which is less than or equal to the height h1 of the stair part. That is, when the height h2 of the second end 1581 is greater than the height h1 of the stair part, the inclination angle of the lower surface of the light guide panel 15 is decreased. This reduces the reflectance of the light guide panel 15, thus decreasing the upward light emitting efficiency of the light emitting part 15a.

In addition, light interference occurs in which light that does not pass through the upper surface 158 of the light emitting part 15a is leaked into the adjacent light guide panel 15 through the second end 1581. Thus, the height h2 of the second end 1581 of the light emitting part 15a is less than or equal to the height h1 of the stair part. When the height of the light incident surface 157 is less than the height h1 of the stair part, light traveling from the light incident part 15b to the light emitting part 15a is excessively diffused so that a dark region is generated on the first side of the light emitting part 15a contacting the light incident part 15b. Thus, the height of the light incident surface 157 is greater than or equal to the height h1 of the stair part.

From the relationship between the height of the light incident surface 157 and the height h1 of the stair part, and from the relationship between the height h1 of the stair part and the height h2 of the second end 1581 of the light emitting part 15a, the height of the light incident surface 157 is equal to or greater than the height h2 of the second end 1581.

Hereinafter, the optical patterns 151 disposed on the light guide panel 15 will now be described in more detail. In particular, FIG. 5 is a plan view illustrating the light guide panel 15 and the light source 13 of FIG. 3, and FIG. 6 is a cross-sectional view taken along line B-B of FIG. 5.

Figure 5:
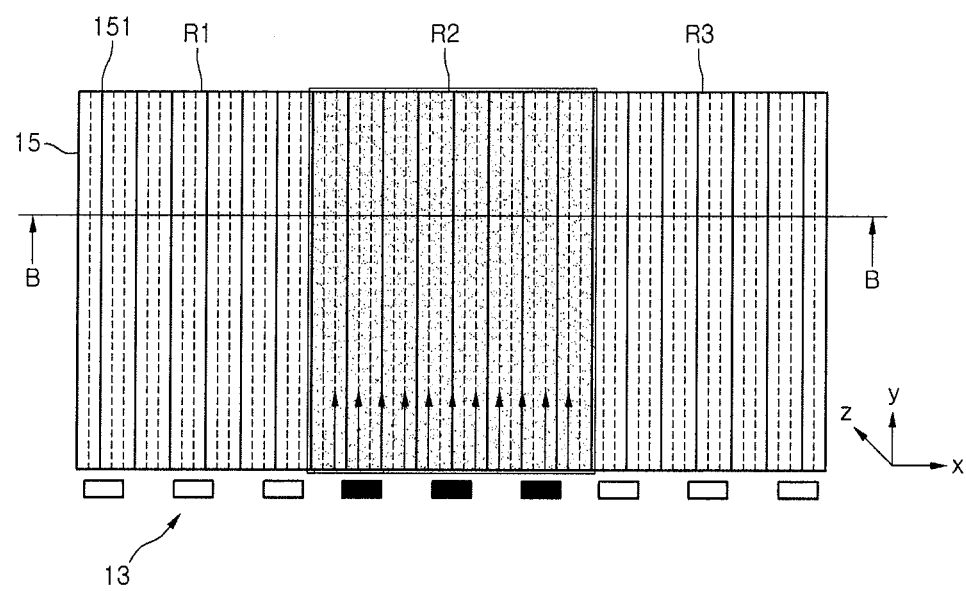
FIG. 5 is a plan view illustrating a light guide panel and a light source of FIG. 3.
Figure 6:
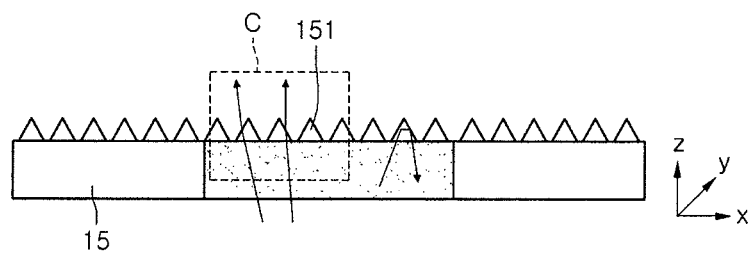
FIG. 6 is a cross-sectional view taken along line B-B of FIG. 5.

Referring to FIGS. 5 and 6, the light guide panel 15 emits light incident along the first direction in a second direction that crosses the first direction and is directed to the upper side of the light guide panel 15. The light sources 13 also provide light to the light guide panel 15, and are included in one or more groups to emit light.

In more detail, as shown in FIGS. 5 and 6, the light guide panel 15 includes first through third sub-driving areas R1, R2 and R3 according to on/off operations respectively of the light sources 13. The first through third sub-driving areas R1, R2 and R3 are arrayed in a third direction crossing the first and second directions. Further, light is selectively incident to the first through third sub-driving areas R1, R2 and R3 from the light sources 13 according to an external signal such as an image signal, and emitted to the outside. Each of the first through third sub-driving areas R1, R2 and R3 can also be driven independently.

Thus, a local dimming function for improving the contrast ratio of an image can be efficiently performed through the selective on/off operations of the optical assemblies 10, and the selective on/off operations of the first through third sub-driving areas R1, R2 and R3 of the light guide panel 15 as described above. The first and third sub-driving areas R1 and R3 are turned off, and the second sub-driving area R2 is turned on as illustrated in FIG. 5. In addition, light incident to the light guide panel 15 and emitted to the outside can be expressed using first through third vector components that are disposed in the first through third directions, respectively.

Further, light emitted from a driven one of the first through third sub-driving areas R1, R2 and R3 can interfere with at least a non-driven one of the first through third sub-driving areas R1, R2 and R3 along the third vector component in the third direction such that a contrast ratio is decreased. Thus, the light guide panel 15 includes the optical pattern 151 for minimizing the third vector component of emitted light and increasing the second vector component. More particularly, the optical pattern 151 is disposed on the upper surface of the light guide panel 15, that is, on a surface transmitting light out of the light guide panel 15 through the optical pattern 151.

In addition, the optical pattern 151 protrudes in the second direction (z-axis direction) from the upper surface of the light guide panel 15 and extends in the first direction (y-axis direction). The optical pattern 151 may also be provided in plurality. In this instance and in one embodiment, the optical patterns 151 are parallel to each other in the first direction.

Further, the widths of the optical patterns 151 are decreased from the lower side to the upper side, that is, in the second direction (z-axis direction) in which light is emitted upward.

The optical patterns 151 can also be formed of transparent material as the light guide panel 15, or be integrally formed with the light guide panel 15.

Figure 7:
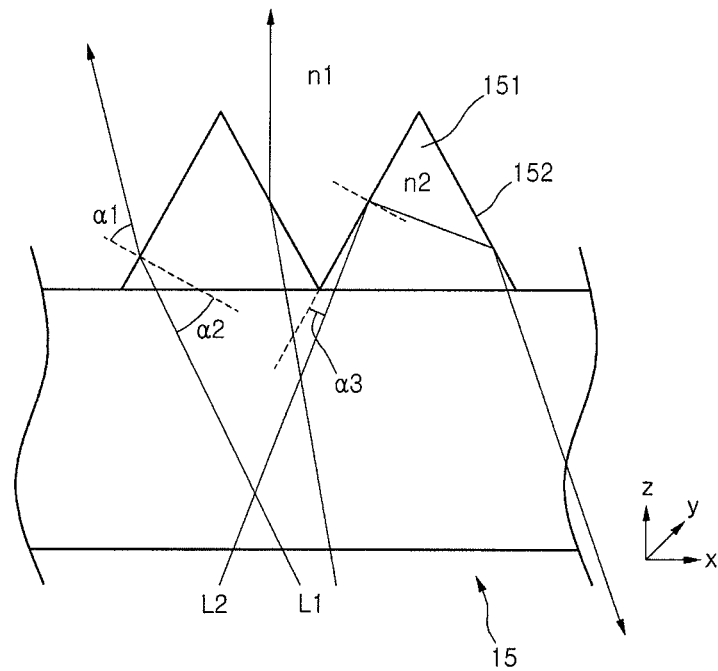
FIG. 7 is an enlarged view illustrating a portion C of FIG. 6.

Hereinafter, the process in which light is emitted from the light guide panel 15 to the outside through the optical patterns 151 will now be described in more detail with respect to FIG. 7, which is an enlarged view illustrating a portion C of FIG. 6. As shown in FIG. 7, the width of the optical pattern 151 in the cross section of FIG. 7 perpendicular to the first direction decreases in the second direction. Further, the optical pattern 151 constitutes the outer surface of the light guide panel 15 and includes a refracting surface 152 where light is substantially refracted. The refracting surface 152 may also be provided in plurality and is inclined at a predetermined angle from a plane in which the light guide panel 15 is provided.

According to the current embodiment, the optical pattern 151 has a triangle cross section. Further, first ends of the two refracting surfaces 152 constituting the optical pattern 151 are spaced apart from each other. The distance between the refracting surfaces 152 is decreased in the second direction, and second ends of the refracting surfaces 152 are in contact with each other.

Thus, as shown in FIG. 7, when a first light ray L1, expressed using the second and third vector components having predetermined magnitudes, is incident to the refracting surface 152 at a first incident angle $\alpha_2$, the first light ray L1 is transmitted at a first transmitted angle $\alpha_1$ according to Snell's law. When the refractive index of air contacting the optical pattern 151 is denoted by $n_1$, and the refractive index of the optical pattern 151 is denoted by $n_2$, Formula 1 is satisfied.

$$\frac{n_1}{n_2} = \frac{\sin\alpha_2}{\sin\alpha_1} \qquad \text{Formula 1}$$

Thus, when the refractive index $n_2$ of the optical pattern 151 is greater than the refractive index $n_1$ of air, the first transmitted angle $\alpha_1$ is greater than the first incident angle $\alpha_2$. That is, an angle at which the first light ray L1 is transmitted from a normal line to the refracting surface 152 is greater than an angle at which the first light ray L1 is incident to the refracting surface 152 from the normal line.

Further, the second vector component of the first light ray L1 transmitted from the refracting surface 152 is greater than the second vector component of the first light ray L1 incident to the refracting surface 152. Also, the third vector component of the first light ray L1 transmitted from the refracting surface 152 is less than the third vector component of the first light ray L1 incident to the refracting surface 152.

According to the current embodiment, the refractive index $n_2$ of the optical pattern 151 may be about 1.47 that is greater than the refractive index $n_1$ of air. A second light ray L2 is also incident to the refracting surface 152 at a second incident angle $\alpha_3$ that is less than the first incident angle $\alpha_2$ of the first light ray L1. Thus, when the second incident angle $\alpha_3$ is less than a critical angle $\alpha_c$ with respect to the optical pattern 151, the second light ray L2 is not transmitted out of the light guide panel 15, but is totally reflected in the light guide panel 15.

The critical angle $\alpha_c$ is determined by Formula 2.

$$\sin\alpha_c = \frac{n_2}{n_1} \qquad \text{Formula 2}$$

That is, the optical pattern 151 decreases the third vector component of light incident thereto and increases the second vector component thereof, so as to prevent light transmitted from a driven one of the first through third sub-driving areas R1, R2 and R3 from interfering with an adjacent one to the driven one of the first through third sub driving areas R1, R2 and R3.

In addition, when the third vector component of light incident to the optical pattern 151 is excessively large, that is, when the inclined angle of light incident to the refracting surface 152 is less than the critical angle $\alpha_c$, the light is totally reflected into the light guide panel 15 to prevent interference with an adjacent one of the first through third sub-driving areas R1, R2 and R3.

According to an embodiment of the present invention, the module-type backlight unit including the light guide panels provides light to the display panel. Thus, the thickness of the display apparatus can be decreased, and the contrast of a display image can be improved using the entire driving method or the local driving method such as the local dimming method and the impulsive method.

In addition, because the backlight unit can be driven using the local dimming method, the entire power consumption of the display apparatus can be reduced. Also, the sub-driving areas are provided to the single light guide panel to improve a local dimming effect, and the optical pattern provided to the light guide panel prevents interference between sub blocks.

Figure 8:
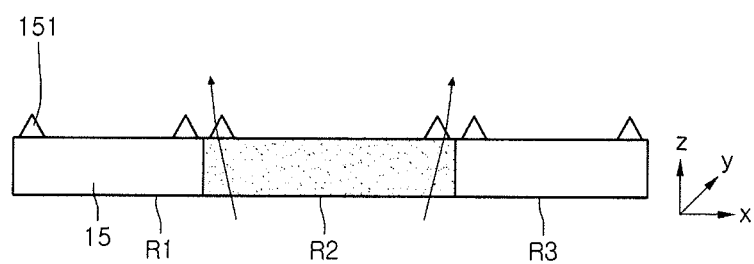
FIG. 8 is a cross-sectional view illustrating a light guide panel according to an embodiment of the present invention.

Next, FIG. 8 is a cross-sectional view illustrating the light guide panel 15 according to another embodiment of the present invention. This embodiment is the same as the previous embodiment, except for the configuration of the optical patterns 151, which will now be described in more detail.

Referring to FIG. 8, the optical patterns 151 according to the current embodiment are disposed at boundaries between the first through third sub-driving areas R1, R2 and R3. In more detail, the optical patterns 151 are disposed at the boundary between the first and second sub-driving areas R1 and R2, and at the boundary between the second and third sub-driving areas R2 and R3.

That is, because the optical interference of the first through third sub-driving areas R1, R2 and R3 occurs mainly at the boundaries between the first through third sub-driving areas R1, R2 and R3, the optical patterns 151 are disposed only at the boundaries between the first through third sub-driving areas R1, R2 and R3 to prevent the optical interference. Thus, the upper surface of the light guide panel 15 for the rest of the first through third sub-driving areas R1, R2 and R3 (except the boundaries) can be an even surface without the optical pattern 151.

Figure 9:
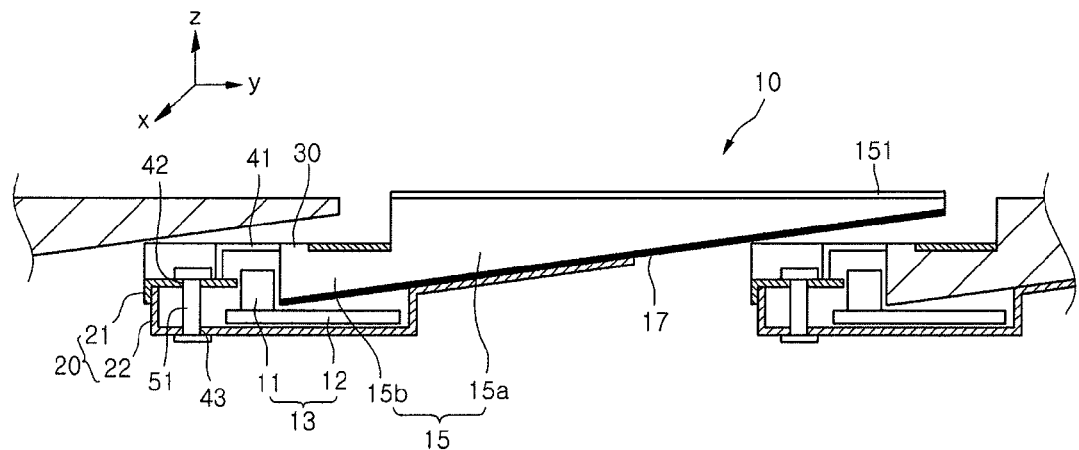
FIG. 9 is a cross-sectional view illustrating a backlight unit according to an embodiment of the present invention.

Next, FIG. 9 is a cross-sectional view illustrating a backlight unit according to another embodiment of the present invention. Referring to FIG. 9, the optical assembly 10 includes the light source 13, the light guide panel 15, the reflecting member 17, and a side cover 20 for fixing the light source 13 and the light guide panel 15. In this embodiment, the side cover 20 provides a fixing position with respect to the bottom cover 110 and includes a first side cover 21 and a second side cover 22.

Further, each of the light guide panels 15 include the light incident part (hereinafter, referred to as a first part) 15b and the light emitting part (hereinafter, referred to as a second part) 15a. The second part 15a includes an upper surface generating a surface light source, a lower surface facing the upper surface, and four side surfaces. In addition, the first part 15b horizontally protrudes from one of the side surfaces of the second part 15a along the lower portion of the side surface. The first part 15b is also a light incident part receiving light from the light source 13, and the second part 152 is a light emitting part that emits light laterally incident through the light incident part to the upper side, thus substantially providing the light to the display panel 210.

According to this embodiment, the adjacent optical assemblies 10, and particularly, two adjacent light guide panels 15 overlap each other in a predetermined area. For example, the light source 13, the first part 15b, i.e., the light incident part, and the side cover 20 are disposed on one side of the optical assembly 10, and the light source 13, the first part 15b, and the side cover 20 are disposed under the adjacent optical assembly 10, and particularly, under the second part 15a of the adjacent optical assembly 10, that is, under the light emitting part. Thus, the optical assemblies 10 partially overlap each other to hide the light source 13, the first part 15b, and the side cover 20 from the front side.

As described above, the adjacent optical assemblies 10 of the backlight unit 100 overlap each other to prevent a bright line or a dark line at the boundary of the optical assemblies 10 and improve the uniformity of light. In addition, the optical pattern 151 protruding in the second direction (z-axis direction) extends in the first direction (y-axis direction) on the upper surface of the light guide panel 15. Further, because the optical pattern 151 according to the current embodiment has the same configuration as that according to the embodiment of FIG. 5, a description thereof is omitted.

In addition, the lower surface of the light guide panel 15 may include a diffusion pattern that has a predetermined pattern to diffuse and reflect incident light, thus improving the uniformity of light at the front surface of the light guide panel 15. The lower surface of the second part 15a of the light guide panel 15, that is, the lower surface of the light emitting part may also be inclined at a predetermined angle so as to gradually decrease in thickness from an adjacent portion to the first part 15b to a distant portion from the first part 15b.

Further, the lower surface of the light guide panel 15 may include the reflecting member 17 that reflects light laterally incident through the first part 15b and guided in the light guide panel 15 to the upper side. In addition, the reflecting member 17 prevents interference of light generated between the overlapped optical assemblies 10.

Figure 10:
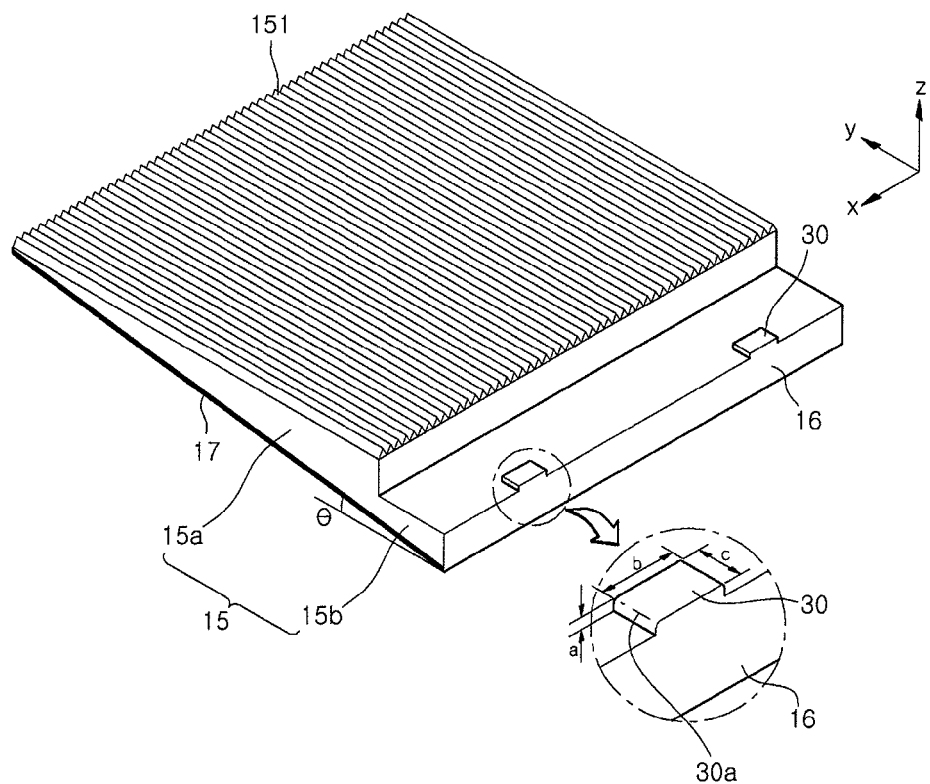
FIG. 10 is a perspective view illustrating a light guide panel of FIG. 9.

Next, FIG. 10 is a perspective view illustrating the light guide panel 15 of FIG. 9. Referring to FIGS. 9 and 10, the light guide panel 15, and particularly, the first part 15b of the light guide panel 15 includes a protrusion 30 protruding with a predetermined height 'a'. In this embodiment, the protrusion 30 is provided to at least two points in the x-axis direction on the upper surface of the first part 15b of the light guide panel 15.

Further, the shape of the protrusion 30 may be varied. For example, the protrusion 30 can have a rectangular parallelepiped shape. The protrusions 30 are also caught by the first side cover 21 to prevent the shaking of the light guide panel 15 along the x-axis and the y-axis. An edge 30a of the protrusion 30 may also be rounded to prevent a crack from being formed at the protrusion 30 by shock due to the movement of the light guide panel 15.

In addition, the height 'a' of the protrusion 30 may range from about 0.3 to 0.6 mm from the upper surface of the first part 15b, and the protrusion 30 may have a width 'b' ranging from about 2 to 5 mm along the x-axis. The protrusion 30 may also have a width 'c' ranging from about 1 to 3 mm along the y-axis. Further, the protrusion 30 may be disposed between neighboring LEDs 11 and adjacent to a light incident surface 16 on the upper surface of the first part 15b so as to prevent optical interference of light emitted from the LEDs 11 due to the protrusion 30 integrally formed with the light guide panel 15.

Also, the light source 13 includes at least one of the LEDs 11, and a module substrate 12 to which the LED 11 is mounted. The LEDs 11 are arrayed along the x-axis on the module substrate 12 and adjacent to the light incident surface 16 of the first part 15b. In addition, the module substrate 12 may include one of a flexible substrate and a printed circuit board (PCB) such as a metal core PCB and a FR-4 PCB, but is not limited thereto. A thermal pad may also be disposed under the module substrate 12 between the module substrate 12 and the second side cover 22.

Light emitted from the LED 11 is also laterally incident to the first part 15b. Colors of light incident from the LEDs 11 may be mixed in the light guide panel 15 including the first part 15b. Further, light emitted from the LEDs 11 is guided in the first part 15b and incident to the second part 15a. The light incident to the second part 15a is reflected upward from the reflecting member 17 disposed on the lower surface of the second part 152. At this point, the diffusion pattern disposed on the lower surface of the light guide panel 15 diffuses and spreads the light to improve the uniformity of the light.

The LEDs 11 may also be spaced a predetermined distance from each other on the module substrate 12, and be disposed in an oblique direction with respect to the protrusion to minimize optical effect due to the protrusion 30 of the light guide panel 15. Accordingly, the distance between the LEDs around the protrusion 30 can be greater than the distance between the other LEDs 11.

Further, the distance between a portion of the LEDs 11 can be greater than the distance between the other LEDs 11 to secure a coupling space of the first side cover 21 and the second side cover 22 and minimize optical effect due to coupling force for pressing the light guide panel 15. For example, when a first distance 'd' between the adjacent LEDs 11 is about 10 mm, a second distance 'e' of the LEDs 11 around the coupling space can be about 13 mm.

The colors of light emitted from the LEDs 11 are also mixed in the light guide panel 15 including the first part 15b to uniformly provide the light to the second part 15a. The side cover 20 surrounding the light source 13 and a portion of the light guide panel 15 also includes the first side cover 21 disposed on the light source 13 and the first part 15b of the light guide panel 15, and the second side cover 22 disposed under the first part 15b. The side cover 20 may also be formed of plastic or metal.

Further, the second side cover 22 facing the lower surface of the first part 15b is bent upward (along the z-axis) at the lower surface of the first part 15b to face the light incident surface 16. A portion 22a of the second side cover 22 is also inclined along the lower surface of the light guide panel 15, that is, along an inclined surface of the light guide panel 15. The second side cover 22 also accommodates the light source 13.

In addition, the first side cover 21 is coupled to the second side cover 22 through a first fixing member 51 to prevent the shaking of the light source 13 and the light guide panel 15 due to external shock, and particularly, prevent the shaking along the z-axis. The second side cover 22 also supports the inclined surface of the light guide panel 15 to firmly maintain alignment of the light guide panel 15 with the light source 13 and protect the light guide panel 15 and the light source 13 from external shock.

Also, the first side cover 21 includes first holes 41 at positions corresponding to the protrusions 30 of the first part 15b. The first holes 41 are larger than the protrusions 30 such that the protrusions 30 are fitted and caught to the first holes 41. The protrusion 30 disposed in the first hole 41 partially also has a predetermined gap that may be a margin for preventing the torsion of the light guide panel 15 when the light guide panel 15 is expanded by environmental change such as sharp temperature increase. In this instance, the rest of the protrusion 30 without the predetermined gap may be in contact with the first side cover 21 to increase fixing force thereof.

In addition, at least one second hole 42 is further disposed in the first side cover 21. The second side cover 22 also includes at least one third hole 43 at a position corresponding to the second hole 42. The backlight unit 100 configured as described above can then be disposed in the bottom cover 110 having a box shape with an open top.

Figure 11:
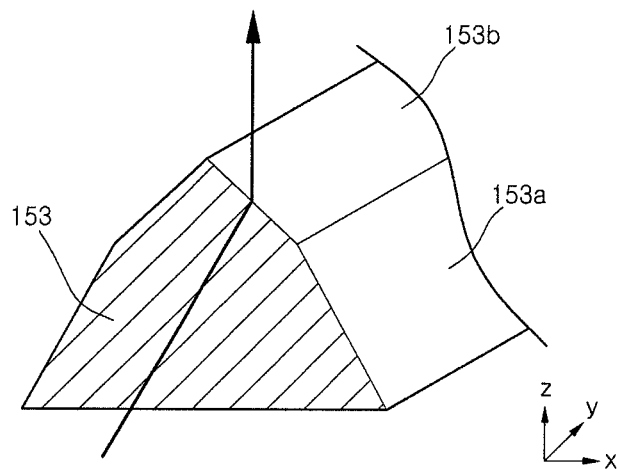
FIG. 11 is a cross-sectional view illustrating an optical pattern according to an embodiment of the present invention.
Figure 12:
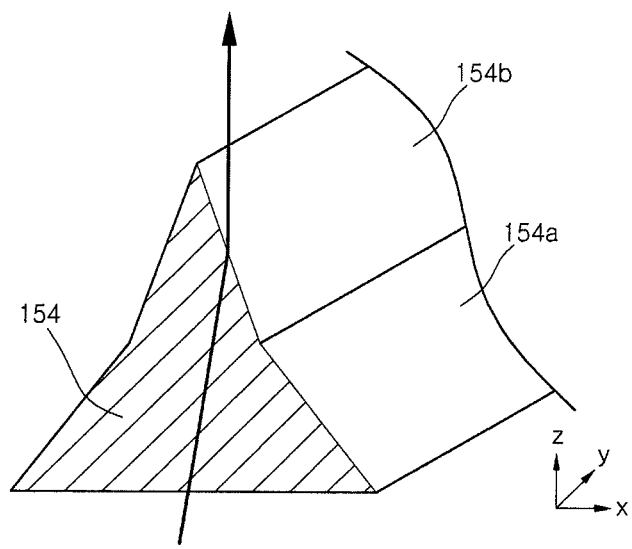
FIG. 12 is a cross-sectional view illustrating an optical pattern according to another embodiment of the present invention.
Figure 13:
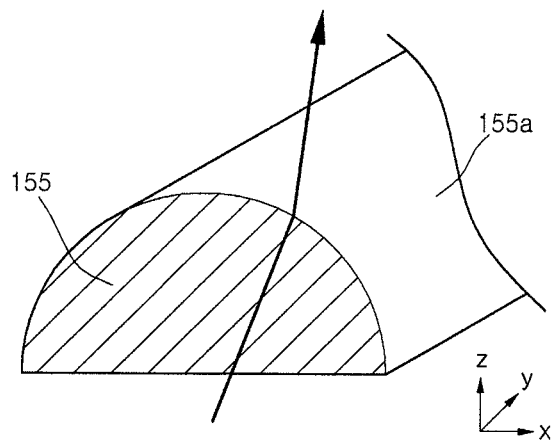
FIG. 13 is a cross-sectional view illustrating an optical pattern according to another embodiment of the present invention.
Figure 14:
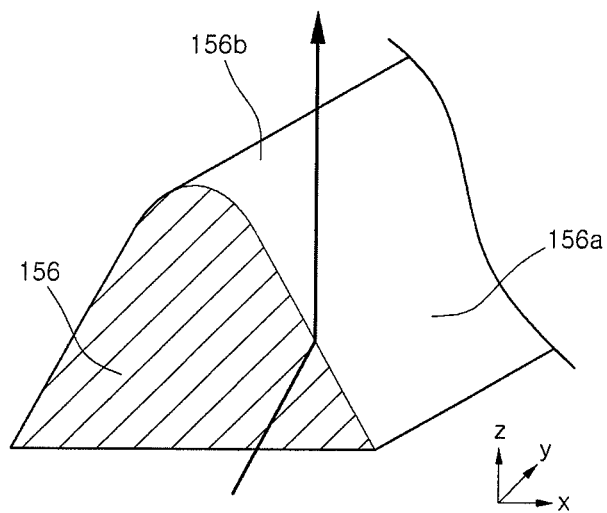
FIG. 14 is a cross-sectional view illustrating an optical pattern according to still another embodiment of the present invention.

Next, FIG. 11 is a cross-sectional view illustrating an optical pattern 153, FIG. 12 is a cross-sectional view illustrating an optical pattern 154, FIG. 13 is a cross-sectional view illustrating an optical pattern 155, and FIG. 14 is a cross-sectional view illustrating an optical pattern 156 according to different embodiments of the present invention.

The embodiments of FIGS. 11 to 14 are the same as the embodiment of FIG. 7, except for the shape of the pattern, which will now be described in more detail. In particular, referring to FIG. 11, a first refracting surface 153a and a second refracting surface 153b of the optical pattern 153 protrude in the second direction (z-axis direction). The inclination of the first refracting surface 153a is greater than that of the second refracting surface 153b. Thus, sides of the cross section of the optical pattern 153 decrease in inclination in the second direction.

Referring to FIG. 12, a first refracting surface 154a and a second refracting surface 154b of the optical pattern 154 protrude in the second direction (z-axis direction). The inclination of the first refracting surface 154a is less than that of the second refracting surface 154b. Thus, sides of the cross section of the optical pattern 154 increase in inclination in the second direction.

Referring to FIG. 13, the optical pattern 155 has a refracting surface 155a having a predetermined curvature, and a half-circular cross section. In addition, referring to FIG. 14, the optical pattern 156 has a couple of first refracting surfaces 156a that are close to each other in the second direction (z-axis direction), and a second refracting surface 156b that is round on the upper side of the first refracting surfaces 156a. Thus, because the second refracting surface 156b protruding upward is round, damage due to friction between the optical pattern 156 and the optical sheet 220 disposed above the optical pattern 156 is minimized.

In addition, as shown in FIGS. 3, 5 and 9, a corresponding light source 13 is a light emitting diode (LED) source, the LED source 13 has a top surface and a bottom surface that are opposite surfaces and side surfaces between the top surface and the bottom surface, and light is emitted from at least one of the side surfaces.

According to the above-described embodiments, the module-type backlight unit including the light guide panels provides light to the display panel. Thus, the thickness of the display apparatus can be decreased, and contrast of a display image can be improved using the entire driving method or the local driving method such as the local dimming method and the impulsive method.

Also, because the backlight unit is driven using the local dimming method, the entire power consumption of the display apparatus can be reduced. In addition, the sub driving areas are provided to the single light guide panel to improve a local dimming effect, and the optical pattern provided to the light guide panel prevents interference between sub blocks.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A back-light unit comprising:
a plurality of substrates;
a plurality of light sources respectively disposed on the plurality of substrates and configured to emit light; and
N (N≧2) light guide panels respectively disposed adjacent to the plurality of light sources, a corresponding light guide panel including a light incidence part having a light incidence surface for receiving light emitted from a corresponding light source, and a light emission part for emitting the received incident light,
wherein the corresponding light guide panel comprises protruding patterns,
the protruding patterns extend in a first direction,
the protruding patterns protrude from an upper surface of the light emission part in a second direction, and
a width of at least a part of each protruding pattern in a third direction decreases from the upper surface of the light emission part along the second direction.

2. The back-light unit of claim 1, wherein at least a portion of the light emission part in a K-th (K=1, 2, . . . , N−1) one of the light guide panels overlaps the light incidence part of a "K+1"-th one of the light guide panels.

3. The back-light unit of claim 1, wherein the light emission part of the corresponding light guide panel has a portion having a thickness changed from one side next to the light incidence part to the other side opposite to the light incidence part.

4. The back-light unit of claim 3, wherein the light emission part of the corresponding light guide panel has a portion having a thickness reduced from one side next to the light incidence part to the other side opposite to the light incidence part.

5. The back-light unit of claim 1, wherein the plurality of light sources are grouped into blocks in which the blocks of light sources are independently driven to turn on and off the light sources in a respective block.

6. The back-light unit of claim 1, wherein a corresponding light source is a light emitting diode (LED) source, the LED source has a top surface and a bottom surface that are opposite surfaces and side surfaces between the top surface and the bottom surface, and light is emitted from at least one of the side surfaces.

7. The back-light unit of claim 1, wherein the incidence surface receives light emitted in the first direction from a corresponding light source, and the light emission part emits the received incident light in the second direction different than the first direction, the protruding patterns arranged above a first group of light sources have a predetermined shape that guides the light in the second direction and refracts light emitted in the third direction away a second group of light sources adjacent to the first group of light sources.

8. The back-light unit of claim 7, wherein the predetermined shape comprises a triangular shape having inclined refracting surfaces such that light incident to the refracting surface at a first incident angle $\alpha_2$, is transmitted at a first transmitted angle $\alpha_1$ according to the following equation:

$$\frac{n_1}{n_2} = \frac{\sin\alpha_2}{\sin\alpha_1}$$

where $n_1$ is the refractive index of air, and $n_2$ is the refractive index of the protruding patterns, and $n_2$ is greater than the $n_1$, and such that light incident to the refracting surfaces at a second incident angle $\alpha_3$ that is less than the first incident angle $\alpha_2$ is refracted and is not transmitted when the second incident angle $\alpha_3$ is less than a critical angle $\alpha_c$ determined by the following formula:

$$\sin\alpha_c = \frac{n_2}{n_1}.$$

9. The back-light unit of claim 7, wherein the predetermined shape comprises a modified triangular shape in which protruding sides of the modified triangular shape have at least two inclination angles which decrease in inclination in the second direction.

10. The back-light unit of claim 7, wherein the predetermined shape comprises a modified triangular shape in which one protruding side of the modified triangular shape has at least two inclination angles which increase in inclination in the second direction.

11. The back-light unit of claim 7, wherein the predetermined shape comprises a half-circular cross section.

12. The back-light unit of claim 7, wherein the protruding patterns are only formed on outside portions of a respective light guide panel that are next to adjacent light guides plates.

13. The backlight unit of claim 1, wherein the corresponding light guide panel comprises a stair part by a height difference between an upper surface of the light incident part and an upper surface of the light emitting part, and
wherein the stair part has a height that is greater than that of an end of the light emitting part distant from the light incident part or equal to the distant end of the light emitting part.

14. The backlight unit of claim 1, wherein the light source has a height that is defined by a distance from an upper surface of the substrate to a top of the light source, and wherein the height of the light source is less than or equal to a height of a light incident surface of the light incident part.

15. A display apparatus comprising:
a display panel; and
a backlight unit at a rear surface of the display panel,
the backlight unit including
a plurality of substrates;
a plurality of light sources respectively disposed on the plurality of substrates and configured to emit light; and
N (N≧2) light guide panels respectively disposed adjacent to the plurality of light sources, a corresponding light guide panel including a light incidence part having a light incidence surface for receiving light emitted from a corresponding light source, and a light emission part for emitting the received incident light,
wherein the light guide panel comprises protruding patterns,
the protruding patterns extend in a first direction,
the protruding patterns protrude from an upper surface of the light emission part in a second direction, and
a width of at least a part of each protruding pattern in a third direction decreases from the upper surface of the light emission part along the second direction.

16. The display apparatus of claim 15, wherein at least a portion of the light emission part in a K-th (K=1, 2, ..., N−1) one of the light guide panels overlaps the light incidence part of a "K+1"-th one of the light guide panels.

17. The display apparatus of claim 15, wherein the light emission part of the corresponding light guide panel has a portion having a thickness changed from one side next to the light incidence part to the other side opposite to the light incidence part.

18. The display apparatus of claim 17, wherein the light emission part of the corresponding light guide panel has a portion has a thickness reduced from one side next to the light incidence part to the other side opposite to the light incidence part.

19. The display apparatus of claim 15, wherein the plurality of light sources are grouped into blocks in which the blocks of light sources are independently driven to turn on and off the light sources in a respective block.

20. The display apparatus of claim 15, wherein the light source is a light emitting diode (LED) source, the LED source has a top surface and a bottom surface that are opposite surfaces and side surfaces between the top surface and the bottom surface, and light is emitted from at least one of the side surfaces.

21. The display apparatus of claim 15, wherein the corresponding light guide panel comprises a stair part by a height difference between an upper surface of the light incident part and an upper surface of the light emitting part, and wherein the stair part has a height that is greater than that of an end of the light emitting part distant from the light incident part or equal to the distant end of the light emitting part.

22. The display apparatus of claim 15, wherein the light source has a height that is defined by a distance from an upper surface of the substrate to a top of the light source, and wherein the height of the light source is less than or equal to a height of a light incident surface of the light incident part.

* * * * *